O. HAUGE.
MACHINE FOR MAKING PASTRY CONES FOR ICE CREAM.
APPLICATION FILED JAN. 27, 1908.

No. 907,797.

Patented Dec. 29, 1908.

WITNESSES:
D. E. Carlsen.
M. M. Carlsen

INVENTOR:
Oscar Hauge.
BY HIS ATTORNEY:
A. M. Carlsen

UNITED STATES PATENT OFFICE.

OSCAR HAUGE, OF ST. PAUL, MINNESOTA, ASSIGNOR OF ONE-HALF TO PETER C. FLAGSTAD, OF ST. PAUL, MINNESOTA.

MACHINE FOR MAKING PASTRY CONES FOR ICE-CREAM.

No. 907,797.

Specification of Letters Patent.

Patented Dec. 29, 1908.

Application filed January 27, 1908. Serial No. 412,700.

*To all whom it may concern:*

Be it known that I, OSCAR HAUGE, a subject of the King of Norway, (but having declared my intention to become a citizen of the United States,) residing at St. Paul, in the county of Ramsey and State of Minnesota, have invented a new and useful Machine for Making Pastry Cones for Ice-Cream, of which the following is a specification.

My invention relates to machines for molding and baking cone-shaped cups for ice-cream; and the objects are to improve such devices in the several respects hereinafter set forth and more particularly pointed out in the claims.

Figure 1:
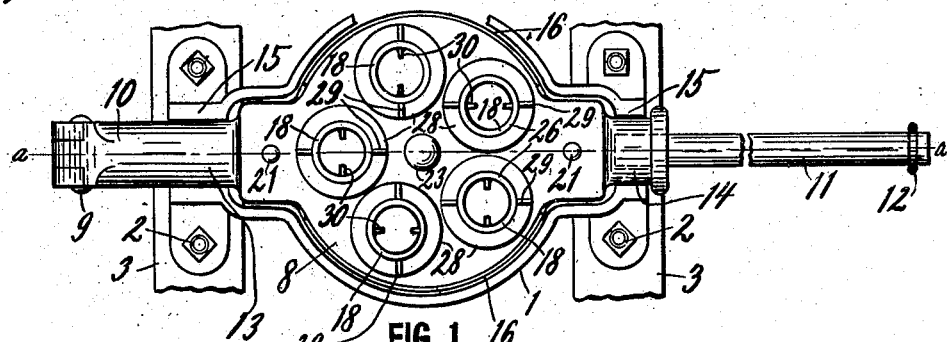
Figure 2:
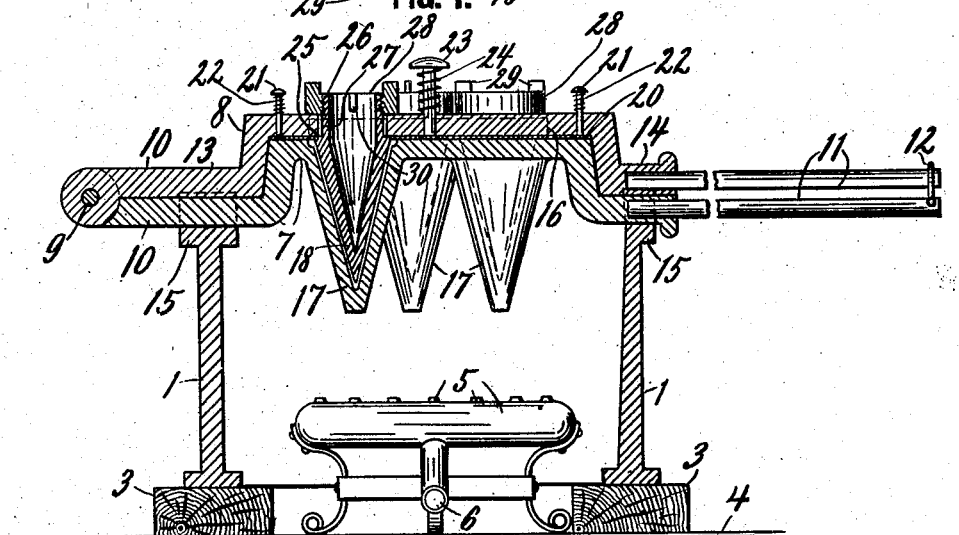
Figures 4, 5, 6:
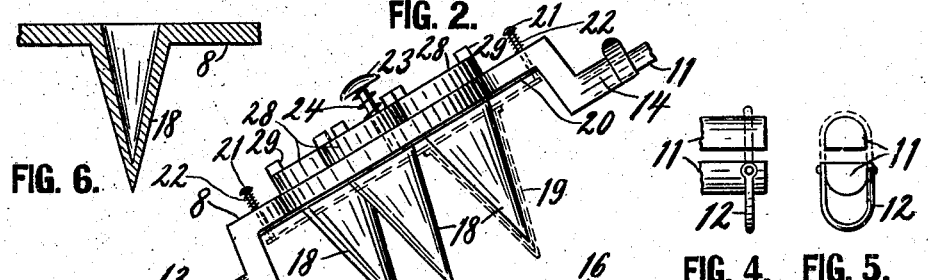
Figure 3:
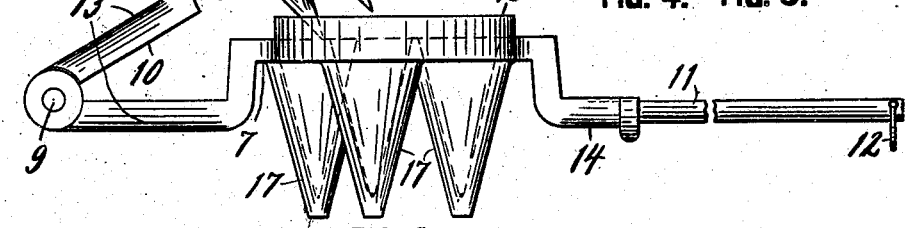

In the accompanying drawing, Figure 1 is a top or plan view of the complete device. Fig. 2 is a vertical section on the line a—a in Fig. 1 except as to the gas burner which is not intersected. Fig. 3 is a side elevation of the molding portion of the device shown as partly opened. Fig. 4 is an enlarged portion close to the right hand end of Fig. 2. Fig. 5 is a right hand end view of Fig. 4. Fig. 6 is a sectional view through one of the internal members of the cone molds modified.

Referring to the drawings by reference numerals, 1 designates a hollow supporting frame secured by bolts 2 upon wooden blocks 3 which may be placed upon any table or bench 4. Within said frame is provided a gas burner 5, having a gas supply pipe 6 and is adapted to furnish the necessary fire and heat to the molding device arranged above the fire. Said molding device is formed of two plate-shaped members, 7 and 8, having hinge bars 10 pivoted together at 9 and handle bars 11, of which one is provided with a pivoted bail 12 adapted to engage over the other arm and thus hold the plates close together during the baking process. When the two members are thus closed, their arms 10 and 11 form at 13 and 14 journals resting in open bearing or notches 15 in the upper edge of the hollow frame 1. The plate 7 is formed with almost semicircular guards 16 extending upon the edges of the plate 8, so as to prevent free escape of the soft dough and thereby secure such pressure in the molds that the dough will form solid cups without blisters or perforations.

The plate 7 is formed with any desired number of cones or cups 17, into which the dough is placed, and the plate 8 is provided with internal cones 18 adapted to descend in the dough, one in each of the external cones 17, leaving a space between each inner and outer cone in which the pastry cone is thus formed and held until baked, when the form is opened and the pastry cones removed. In Fig. 3 one of the pastry cones is indicated in dotted lines 19 as sticking on the internal cone of the mold.

As the pastry cones, cornets or horns, as they are variously termed, shrink as they are dried by the heat and therefore stick to the inner cones 18, I provide for their quick and simultaneous removal a stripping plate 20, which fits snugly about the thicker part of each cone 18, and is provided with two headed stems 21 projecting upward through apertures in the mold plate 8, and encircled by compressed springs 22 by which the stripper is normally held close to the plate 8. The stripper also has a central pushing stem 23 encircled by a spring 24. A push or knock on the latter stem causes the stripper to dislodge all the pastry cones at one time and let them drop on a table or other support.

During the baking process the entire mold is turned in the bearing 15 so as to present to the fire the inner and outer cone members alternately. And in order to admit the heat effectively to the inner cones 18 these are made hollow and the shell of their smaller ends are made thinner than at the larger end where the heat has easier access, as is best shown in Fig. 6.

In Fig. 6 the cone is shown in its simplest form or cast integral with the plate. This method will not insure concentric position of the inner and outer cones, nor permit of readily finishing of the cones in manufacturing. I therefore make each cone 18 separate, form it with an annular shoulder 25 and a hollow threaded stem 26 extending from the shoulder through a hole 27 in the plate 8 and provide it with a nut 28 upon the plate. The hole in the plate is larger than the stem so that the cone may be adjusted to central position with the lower cone before the nut is tightened against the plate. As said nuts come pretty close together they are provided with lugs 29 of which to take hold with a suitable tool in turning them, and the cone stems are provided with internal lugs 30, to which a suitable tool is applied so as to prevent turning of the cone while the nut is being tightened. During such tightening of the nut, a cone of card board or like material of the required thickness is inserted between the outer and inner cones to secure central position of the latter.

Having thus described my invention, what I claim is:

1. A molding and baking device for ice-cream cups and the like, comprising two members hinged together and provided one with outer hollow cones and the other with inner hollow cones adapted to go into the outer cones and form intervening spaces for the dough, said inner cones having their walls reduced in thickness toward the small ends of the cones.

2. A molding and baking device for ice-cream cups and the like, comprising two members hinged together and provided one with outer hollow cones and the other with inner hollow cones adapted to go into the outer cones and form intervening spaces for the dough, said member holding the outer cones having guarding rims extending over the edges of the member holding the inner cones.

3. A molding and baking device for ice-cream cups and the like, comprising two members hinged together and provided one with outer hollow cones and the other with inner hollow cones adapted to go into the outer cones and form intervening spaces for the dough, a stripping plate fitting the base end of the inner cones and having stems extending from it through the member holding said cones, and springs acting on said stems to hold the stripper normally in idle position.

4. A molding and baking device for ice-cream cups and the like, comprising two members hinged together and provided one with outer hollow cones and the other with inner hollow cones adapted to go into the outer cones and form intervening spaces for the dough, a stripping plate fitting the base end of the inner cones and having stems extending from it through the member holding said cones, and springs acting on said stems to hold the stripper normally in idle position, and a push piece projecting from the middle of the stripper through the member carrying it.

In testimony whereof I affix my signature in presence of two witnesses.

OSCAR HAUGE.

Witnesses:
A. M. CARLSEN,
C. J. FLAGSTAD.